United States Patent [19]
Zanker

[11] 3,852,317
[45] Dec. 3, 1974

[54] PRODUCTION OF ISOCYANATES
[75] Inventor: Fritz Zanker, Worms, Germany
[73] Assignee: Badische Anilin- & Soda-Fabrik Aktiengesellschaft, Ludwigskafen/Rhine, Germany
[22] Filed: Oct. 25, 1972
[21] Appl. No.: 300,738

[52] U.S. Cl. .................... 260/453 P, 260/453 AL
[51] Int. Cl. .......................................... C07c 119/04
[58] Field of Search ................ 260/453 PH, 453 P

[56] References Cited
UNITED STATES PATENTS
3,465,023  9/1969  Kamal ........................... 260/453
3,641,094  2/1972  Arlt et al. ....................... 260/453

Primary Examiner—Lewis Gotts
Assistant Examiner—Dolph H. Torrence
Attorney, Agent, or Firm—Johnston, Keil, Thompson & Shertleff

[57]  ABSTRACT

The production of isocyanates by reaction of carbamyl chlorides with water in the presence of acids. Isocyanates prepared by the process of the invention are valuable starting materials for the production of plant protection agents, pesticides, dyes, synthetic resins and plastics, textile waterrepellents, detergents, bleaching agents and adhesives.

12 Claims, No Drawings

PRODUCTION OF ISOCYANATES

The invention relates to a process for the production of isocyanates by reaction of carbamyl chlorides with water in the presence of acids.

It is known that isocyanates can be prepared from carbamyl chlorides with organic bases such as tertiary amines or N,N-dialkylcarboxamides (German Laid-open Specification No. 1,593,554) in organic solvents. Isocyanates can also be obtained with aqueous solutions or suspensions of inorganic bases such as alkali metal hydroxides, alkaline earth metal hydroxides, alkali metal carbonates, alkaline earth metal carbonates or alkali metal hydrogen carbonates (UK Patent No. 1,208,862). U.S. Pat. No. 3,465,023 makes specific reference to the fact that the formation of hydrogen chloride in the production of isocyanates decreases the reactivity of the end product and that therefore the removal or combination of the hydrogen chloride in the process is important. Difficulties are also encountered in distilling the isocyanate, and corrosion is observed in the plant. The said methods have the disadvantage that the isocyanates are formed in a medium in which they are susceptible to decomposition. Thus it is known from Houben-Weyl, "Methoden der organischen Chemie," volume 8, page 136 (1952) that isocyanates dimerize in the presence of tertiary amines. They are extremely unstable in the presence of aqueous alkali and even when stoichiometric amounts of aqueous alkali are used they are converted to a great extent into carbamates and carbamic acid.

The object of this invention is to provide a new process in which isocyanates are obtained in good yields and purity by a simpler and more economical method.

We have found that isocyanates of the general formula (I):

$$R-N=C=O \qquad (I)$$

in which R is an aliphatic, cycloaliphatic, araliphatic or aromatic radical are obtained advantageously from carbamyl halides of the general formula (II):

in which R has the meanings given above and X is halogen by elimination of hydrogen halide by carrying out the reaction in the presence of water and acid.

When isopropylcarbamyl chloride is used as starting material the reaction may be represented by the following equation:

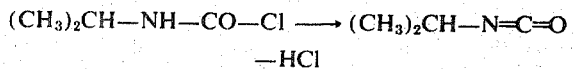

The invention stems from the observation that the production of isocyanates with carbamyl chlorides as starting material, particularly on an industrial scale, can be carried out mildly and with a good yield of pure end product by avoiding the addition of basic acid acceptors. The reaction can be carried out with better results than in the prior art in the presence of water alone which eliminates hydrogen chloride from the starting material.

As compared with prior art methods the process of the invention gives isocyanates in a good yield and purity by a simpler and more economical method. These advantageous results are surprising because the prior art suggested hydrolysis of the starting material to carbamic acid and considerable reformation of the starting material from the isocyanate formed and hydrogen halide. Difficulties in regard to distillation, corrosion problems and decrease in reactivity of the end product described in said U.S. Patent do not occur to any appreciable extent.

Since, unlike the prior art methods, no base is added in the reaction, there is no heat of neutralization of the hydrogen chloride and thus no need to remove heat of neutralization which promotes decomposition of the end product, a measure which is very difficult to carry out on an industrial scale.

Preferred starting materials (II) and accordingly preferred end products (I) are those in whose formulae R is alkyl of one to twelve, preferably one to six, carbon atoms, alkenyl or alkynyl in each case of two to six carbon atoms, cycloalkyl of five to eight carbon atoms onto which through two or three common carbon atoms a five-membered or six-membered alicyclic ring may be condensed, alkyl of one to six carbon atoms which may be substituted by cycloalkyl of five or six carbon atoms on to which through two or three common carbon atoms a five-membered or six-membered alicyclic ring may be condensed, aralkyl of seven to twelve carbon atoms, phenyl or naphthyl and X is bromine or preferably chlorine. The said radicals may also bear, as substituents, groups and/or atoms which are inert under the reaction conditions, for example alkyl, alkoxy or alkylthio each of one to five carbon atoms, carbalkoxy, alkenyl or alkynyl each of two to five carbon atoms, chlorine, fluorine, bromine, trifluoromethyl, nitrile, phenylthio, cyclohexylthio or benzylthio groups.

The following are examples of starting materials (II): methylcarbamyl, ethylcarbamyl, n-propylcarbamyl, isopropylcarbamyl, n-butylcarbamyl, isobutylcarbamyl, sec-butylcarbamyl, t-butyl-carbamyl, 2-methylbutyl-(1)-carbamyl, 3-methylbutyl-(1)-carbamyl, 2-methylbutyl-(2)-carbamyl, 3-methylbutyl-(2)-carbamyl, pentyl-(1)-carbamyl, pentyl-(2)-carbamyl, pentyl-(3)-carbamyl, neopentylcarbamyl, n-hexylcarbamyl, n-octylcarbamyl, chloromethylcarbamyl, 2-chloroethylcarbamyl, 3-chloropropylcarbamyl, 4-chlorobutylcarbamyl, 6-chlorohexylcarbamyl, 1-chloropropyl-(2)-carbamyl, 1-chlorobutyl-(2)-carbamyl, chloro-t-butylcarbamyl, bromo-t-butylcarbamyl, 1,1-bischloromethylethyl-(1)-carbamyl, trischloromethylmethylcarbamyl, allycarbamyl, 3,3-dimethylallyl-(3)-carbamyl, 3-methyl-3-ethylallyl-(3)-carbamyl, butyn-(1)-yl-(3)-carbamyl, 3-methylbutyn-(1)-yl-(3)-carbamyl, 3-methylpentyn-(1)-yl-(3)-carbamyl, 1-ethynylcyclohexylcarbamyl, cyclopentylcarbamyl, cyclohexylcarbamyl, methylcyclohexylcarbamyl, cyclooctylcarbamyl, norbornyl-(2)-carbamyl, 1-norbornyl-(2)-ethyl-(1)-carbamyl, 2-methoxyethylcarbamyl, 2-ethoxyethylcarbamyl, 3-methoxypropylcarbamyl, 3-ethoxypropylcarbamyl, 1-methoxybutyl-(2)-carbamyl, 1-n-propoxypropyl-(2)-carbamyl, methoxy-t-butylcarbamyl, ethoxy-t-butylcarbamyl, 2-methylthioethylcarbamyl, 2-ethylthioethylcarbamyl, 3-methylthiopropylcarbamyl, 3-ethylthiopropylcarbamyl, 1-methylthiobutyl-(2)-carbamyl, 1-n-propylthiopropyl-(2)-carbamyl, phenylthio-t-butylcarbamyl, cyclohexylthio-t-butyl-carbamyl, benzylthio-t-butylcarbamyl, 5-cyanopentylcarbamyl, carbethoxymethylcarbamyl, phenylcarbamyl, p-chlorophenylcarbamyl, 3,4-dichlorophenylcarbamyl, 2,4-dichlorophenylcarbamyl, 3,5-dichlorophenylcarbamyl, 2,4,5-trichlorophenylcarbamyl, p-fluoro-phenylcarbamyl, p-bromophenylcarbamyl, 3-trifluoromethylphenylcarbamyl, 2-trifluoromethyl-4-chlorophenylcarbamyl, 2-chloro-4-methylphenylcarbamyl, 3,4-dimethylphenylcarbamyl, 3,5-dimethylphenylcarbamyl, 4-ethylthiophenylcarbamyl, 3-methoxyphenylcarbamyl, 4-ethoxyphenylcarbamyl, 3-cyanophenylcarbamyl, 4-carbomethoxyphenylcarbamyl, benzylcarbamyl, 4-cyanobenzylcarbamyl and α-naphthylcarbamyl chlorides and the corresponding carbamyl bromides.

The reaction is carried out in the presence of water, conveniently in an amount of from 20 to 20,000%, preferably of from 50 to 10,000%, by weight based on starting material (II). Some of the water may also be present in the form of ice. It is convenient to use the hydrogen halide, preferably hydrogen chloride, formed in the reaction as the acid; the amount of this naturally depends on the amount of starting material (II). Such an amount of water and if desired ice is advantageously placed in the reactor that during the reaction the continuously increasing acid concentration of the reaction mixture does not exceed 30%, preferably not 10%, by weight of hydrogen halide based on the total weight of water. If desired other organic or inorganic acids may be added, for example sulfuric acid, phosphoric acid, sulfonic acids such as benzenesulfonic acid and p-toluenesulfonic acid, boric acid, chloroacetic acid, formic acid, acrylic acid, oxalic acid, acetic acid, adipic acid, maleic acid or appropriate mixtures. Such additional acids are generally added in an amount of from 0.1 to 1, advantageously from 0.1 to 0.2, mole per mole of starting material (II).

It is advantageous also to use in the reaction an alkali metal or alkaline earth metal salt of a mineral acid, advantageously a chloride or sulfate of one of the metals sodium, potassium, magnesium, calcium or appropriate mixtures. Sodium chloride and magnesium chloride are preferred. It is convenient to add from 5 to 40% by weight of salt based on the total amount of water. The addition of these salts facilitates working up.

The reaction is generally carried out at a temperature of from −30° to +30°C, preferably from −15° to +15°C, at atmospheric or superatmospheric pressure, continuously or batchwise. It is convenient to use organic solvents which are inert under the reaction conditions, advantageously those having good solubility for the starting material (II) but having little or no miscibility with water. Examples of solvents are: aliphatic or cycloaliphatic hydrocarbons such as petroleum ether, ligroin, pentane, hexane, heptane, cyclohexane, methylcyclohexane; chlorinated hydrocarbons such as methylene chloride, chloroform, carbon tetrachloride, dichloroethane, trichloroethylene; aromatic hydrocarbons such as benzene, toluene, xylene, mesitylene, chlorobenzene, dichlorobenzene, trichlorobenzene, or chloronaphthalene; ethers such as diethyl ether or diisopropyl ether; esters such as ethyl acetate or butyl acetate; and appropriate mixtures. The organic solvent is used as a rule in an amount of from 10 to 10,000% by weight based on starting material (II). If desired the said solvents may have added to them ketones, for example acetone, methyl ethyl ketone or cyclohexanone; nitriles, for example acetonitrile; and cyclic ethers such as tetrahydrofuran or dioxane, and these additives advantageously do not exceed 50% by weight based on the abovementioned solvents.

The reaction may be carried out as follows: A mixture of starting material (II), water with or without acid, solvent and/or mineral salt is kept at the reaction temperature for from two to five hundred minutes while mixing well. When preparing the mixture it is convenient to place the water in the reactor first. Since elimination of hydrogen chloride from carbamyl chlorides is exothermic, efficient cooling should be provided during the reaction. A blade stirrer or turbine impeller is particularly suitable in batch operation, while in continuous operation (for which the process according to the invention is especially suitable chiefly because of the short reaction periods) use may be made for example of cocurrent flow mixing nozzles such as jet nozzles, preferably having an impulse exchange tube, mixing zones or countercurrent mixing chambers. The end product may be isolated from the reaction mixture (which as a rule is binary) by a conventional method, for example by separation, with or without drying, of the organic phase of the mixture and fractional distillation or crystallization.

In a preferred embodiment the reaction is carried out in an endless tube system in which the reaction mixture is continuously recycled. At the same time there are supplied continuously to the system the starting material and water through separate metering pumps, conveniently at points not too far apart, while some of the reaction mixture is removed simultaneously and continuously from another point in the system which is advantageously as far away as possible. Efficient mixing is ensured by inbuilt baffles. Short residence times of from three to four minutes are sufficient for reaction in the tubular reactor. Temperatures of from −7° to +5 °C are preferred in the reactor.

Isocyanates prepared by the process of the invention are valuable starting materials for the production of plant protection agents, pesticides, dyes, synthetic resins and plastics, textile water repellents, detergents, bleaching agents and adhesives. Their reaction into urethanes, for example for use as expanded plastics or high molecular weight coatings having high flexibility, or ureas is of particular importance. Reference is made to Ullmanns "Encyklopadie der technischen Chemie," volume 9, pages 11, 12 and 404 and volume 17, page 204, concerning their use.

The following Examples illustrate the invention.

The parts specified are parts by weight. They bear the same relation to parts by volume as the kilogram to the liter.

EXAMPLE 1

In two reactions 1a and 1b, 100 parts of a 7% by weight solution of isopropylcarbamyl chloride in toluene is added in one batch to 100 parts of water cooled to 0° to 5°C (1a) and to 100 parts of 5% by weight aqueous sulfuric acid (1b). In each case the mixture is stirred vigorously by means of a blade stirrer at 0° to 5°C. Samples of the organic phase are removed at intervals of fifteen minutes, dried well with sodium sulfate and the content of isopropylcarbamyl chloride and isopropyl isocyanate in the toluene phase is determined by means of infrared spectroscopy. The Table shows the following results:

A = % by weight of isopropylcarbamyl chloride;
B = % by weight of isopropyl isocyanate; based on the toluene solution;
ST = stirring time in minutes

|  |  | ST | A | B |
|---|---|---|---|---|
| (1a) | Water | 15 | — | 4 – 5 |
| (1b) | 5% $H_2SO_4$ | 15 | — | 4 – 5 |

EXAMPLE 2

80.0 parts of a 34% by weight solution of isopropylcarbamyl bromide in toluene is added in one batch to a mixture of 200 parts of water and 200 parts of ice. The mixture is stirred vigorously for eight minutes, the temperature falling to −4°C with partial melting of the ice. The organic phase is separated, dried well at 0° to 5°C over sodium sulfate and processed by distillation. 12.8 parts (91% of theory) of isopropyl isocyanate devoid of bromine is obtained; boiling point 72° to 74°C.

EXAMPLE 3

100.0 parts of a 39% by weight solution of isopropylcarbamyl chloride in toluene is combined with a mixture of 200 parts of water and 200 parts of ice and stirred vigorously for 4 minutes, the temperature falling to −5 °C. The phases are separated. The organic phase is processed as described in Example 2. 25.0 parts (91% of theory) of isopropyl isocyanate devoid of chlorine is obtained; boiling point: 72° to 74°C.

EXAMPLE 4

The reaction is carried out as described in Example 3 using xylene instead of toluene. 15.8 parts (58% of theory) of isopropyl isocyanate contaminated by 0.3 part of isopropylcarbamyl chloride is obtained; boiling point: 72° to 74°C.

EXAMPLE 5

20 parts of liquid isopropylcarbamyl chloride is cooled to 0°C and added all at once to a mixture of 100 parts of ice and 100 parts of water while stirring vigorously. After stirring for another five minutes the phases are separated. In the manner described in Example 2 10.3 parts (73% of theory) of isopropyl isocyanate is obtained; boiling point: 72° to 74°C.

EXAMPLE 6 a. 380 parts of isopropylcarbamyl chloride is dissolved in 240 parts by volume of 1,2-dichloroethane and forced together with 3500 parts of water (cooled to 3°C) at a pressure of 3 atmospheres upwardly by means of a vertical jet nozzle having a superposed impulse exchange tube into a vertical cylinder filled with 4500 parts of water cooled to 3°C continuously within one minute. The overflow is withdrawn through two descending condensers also cooled to 3°C and finally combined with the amount of liquid remaining in the cylinder. The phrases are separated. The organic phase is dried over sodium sulfate while stirring at 3°C and the molar ratio of isopropylcarbamyl chloride : isopropyl isocyanate : 1,2-dichloroethane is determined as 0 : 50 : 50 by means of NMR-spectroscopy. This is equivalent to a yield of isopropyl isocyanate of 97 to 98% of theory. The colorless isopropyl isocyanate solution in 1,2-dichloroethane may be used immediately for further reactions.

b. In a reaction of 459 parts of isopropylcarbamyl chloride in 266 parts by volume of 1,2-dichloroethane a molar ratio of isopropylcarbamyl chloride : isopropyl isocyanate : 1,2-dichloroethane of 0 : 53 : 47 is found; this is equivalent to a practically quantitative yield.

EXAMPLE 7

A mixture of 65.7 parts of methylcarbamyl chloride and 90.6 parts of benzene is cooled to 5°C and there is added to it a mixture of 400 parts of a 15% by weight aqueous sodium chloride solution and 400 parts of ice with vigorous stirring. After four minutes the phases are separated. The benzene phase is dried and distilled. 23.5 parts (58% of theory) of methyl isocyanate is obtained; boiling point 38° to 40°C.

EXAMPLE 8 a. A mixture of 35 parts of ethylcarbamyl chloride and 65 parts of chlorobenzene is added with vigorous stirring to a mixture of 200 parts of ice and 200 parts of water. The mixture is stirred for another four minutes and then processed as described in Example 2. 20.0 parts (87% of theory) of ethyl isocyanate free from chlorine is obtained; boiling point: 61° to 62°C. b. Analogous reaction with 39 parts of allylcarbamyl chloride gives a yield of 82% of theory of allyl isocyanate (boiling point 87° to 89°C), reaction with 59 parts of 1-methylthiobutyl-(2)-carbamyl chloride gives a yield of 87% of theory of 1-methylthiobutyl-(2) isocyanate; boiling point 54°C at 0.5 mm.

EXAMPLE 9 a. A mixture of 200 parts of ice and 200 parts of water is added all at once with stirring to a mixture cooled to 5°C of 31 parts of diethyl ether, 30 parts of n-pentane and 39.6 parts of n-propylcarbamyl chloride. After another four minutes the mixture is processed as described in Example 2. 23.0 parts (83% of theory) of n-propyl isocyanate devoid of carbamyl chloride is obtained; boiling point 82° to 84°C.

b. The corresponding yield of the n-butyl isocyanate from 42 parts of n-butylcarbamyl chloride is 87% of theory; boiling point 115° to 117°C.

EXAMPLE 10 a. A mixture of 38 parts of isobutylcarbamyl chloride and 112 parts of diethyl ether is added to a mixture of 150 parts of ice and 150 parts of water while stirring vigorously. After six minutes the mixture is processed as described in Example 2. 24.3 parts of isobutyl isocyanate free from halogen is obtained (87% of theory); boiling point 104° to 105°C.

b. Analogous reaction with 43.7 parts of 1-chloropropyl-(2)-carbamyl chloride gives a yield of 78% of the theory of 1-chloropropyl-(2) isocyanate having a boiling point of 52° to 53°C (18 mm), and reaction with 37 parts of butyn-(1)-yl-(3)-carbamyl chloride gives a yield of 83% of theory of butyn-(1)-yl-(3) isocyanate; boiling point 104°C.

EXAMPLE 11

40 parts of crystalline t-butylcarbamyl chloride is mixed with 60 parts of chloroform and added while stirring vigorously to a mixture of 180 parts of ice and 180 parts of water in two quickly following portions. After eight minutes the mixture is processed as described in Example 2. The yield of t-butyl isocyanate devoid of carbamyl chloride is 26.7 parts (91% of theory); boiling point: 85°C.

Analogous reaction with 43 parts of 3-methylbutyn-(1)-yl-(3)-carbamyl chloride gives a yield of 81% of theory of 3-methylbutyn-(1)-yl-(3) isocyanate having a boiling point of 45°C at 110 mm, with 53.5 parts of methylthio-t-butylcarbamyl chloride a yield of 84% of theory of methylthio-t-butyl isocyanate of the boiling point 76°C at 20 mm, with 63.2 parts of bromo-t-butylcarbamyl chloride a yield of 69% of theory of bromo-t-butyl isocyanate having a boiling point of 102° to 103°C at 18 mm, with 50 parts of benzylcarbamyl chloride a yield of 77% of theory of benzyl isocyanate having a boiling point of 82° to 84°C at 10 mm, with 49 parts of carboethoxymethylcarbamyl chloride a yield of 84% of theory of ethyl isocyanatoacetic acid having a boiling point of 67° to 69°C at 13 mm, with 40 parts of n-butylcarbamyl chloride a yield of 85% of theory of n-butyl isocyanate having a boiling point of 114° to 117°C, and with 51.2 parts of norbornyl-(2)-carbamyl chloride a yield of 83% of theory of norbornyl-(2) isocyanate having a boiling point of 85° at 40 mm.

EXAMPLE 12

30 parts of crystalline 1-ethynylcyclohexylcarbamyl chloride is cooled together with 90 parts of ethyl acetate to 0°C and united with a mixture of 50 parts of ice and 150 parts of water with vigorous stirring. After stirring for seven minutes and processing as described in Example 2, 22.1 parts of 1-ethynylcyclohexyl isocyanate (91% of theory) is obtained having a boiling point of 51°C at 1.5 mm.

In analogous reactions the yield of sec-butyl isocyanate from 21.9 parts of sec-butylcarbamyl chloride is 90% of theory having a boiling point of 100° to 102°C, of 1-norbornyl-(2')-ethyl isocyanate from 32.6 parts of 1-norbornyl-(2)-ethylcarbamyl chloride is 75% of theory having a boiling point of 97° to 99°C at 23 to 24 mm.

EXAMPLE 13 a. 127.2 parts of a toluene solution containing 26% by weight of β-methylthioethylcarbamyl chloride and 3% by weight of β-methylthioethyl isocyanate is cooled to 0°C and added all at once to a mixture of 200 parts of ice and 200 parts of water. The whole is stirred vigorously for eight minutes, and then processed by distillation as described in Example 2. 31.2 parts of 85% by weight β-methylthioethyl isocyanate free from chlorine and contaminated with 15% by weight of toluene is obtained having a boiling point of 72° to 75°C at 18 mm (73% of theory).

b. Analogous reaction with 32.5 parts of 1-n-propoxypropyl-(2)-carbamyl chloride gives a yield of 87% of theory of 1-n-propoxypropyl-(2) isocyanate having a boiling point of 72° to 74°C at 26 mm.

EXAMPLE 14 a. 100 parts of a chlorobenzene solution containing 8% by weight of 2methyl-4-chlorophenylcarbamyl chloride and 34% by weight of 2-methyl-4-chlorophenyl isocyanate is added all at once at 0°C to a mixture of 120 parts of ice and 360 parts of water with vigorous stirring. After stirring for four minutes the content of 2-methyl-4-chlorophenylcarbamyl chloride in the mixture is 2% by weight and of 2-methyl-4-chlorophenyl isocyanate is 39% by weight. After stirring for fifteen minutes the mixture is worked up. 38.1 parts of 2-methyl-4-chlorophenyl isocyanate (62% of theory based on reacted 2-methyl-4-chlorophenylcarbamyl chloride) is obtained. The boiling point is 49°C at 0.3 mm.

b. A mixture of 17.5 parts of phenylcarbamyl chloride and 82.5 parts of chlorobenzene under otherwise the same conditions gives 11.3 parts of phenyl isocyanate (84% of theory) having a boiling point of 55° to 57°C at 16 mm, a mixture of 21 parts of m-trifluoromethylphenylcarbamyl chloride and 250 parts of chlorobenzene gives 11.8 parts (67% of theory) of m-trifluoromethylphenyl isocyanate having a boiling point of 54°C at 11 mm.

I claim:

1. A process for the production of an isocyanate of the formula:

(I)

in which R is alkyl of 1 to 12 carbon atoms, alkenyl or alkynyl of 2 to 6 carbon atoms each, cycloalkyl of 5 to 8 carbon atoms onto which through two or three common carbon atoms a five-membered or six-membered alicyclic ring may be condensed, alkyl of 1 to 6 carbon atoms which may be substituted by cycloalkyl of 5 or 6 carbon atoms onto which through two or three common carbon atoms a five-membered or six-membered alicyclic ring may be condensed, aralkyl of 7 to 12 carbon atoms, phenyl or naphthyl with the proviso that all of said radicals R may bear inert substituents selected from the group consisting of alkyl, alkoxy or alkylthio of 1 to 5 carbon atoms each, carbalkoxy, alkenyl or alkynyl of 2 to 5 carbon atoms each, chlorine, fluorine, bromine, trifluoromethyl, nitrile, phenylthio, cyclohexylthio or benzylthio, which process comprises eliminating hydrogen halide from a carbamyl halide of the formula:

(II)

in which R has the meanings given above and X is bromine or chlorine, by contact with a liquid aqueous acidic reaction medium consisting essentially of water and an acid selected from the group consisting of hydrogen chloride and hydrogen bromide at a temperature of from −30° to +30°C., the acid concentration increasing over the course of the reaction but being controlled such that it does not exceed about 30% by weight of hydrogen halide based on the total weight of water.

2. A process as claimed in claim 1 wherein the reaction is carried out in a reaction mixture which is continuously recycled, starting material (II) and water being supplied continuously and some of the reaction mixture being withdrawn continuously.

3. A process as claimed in claim 1 wherein the reaction is carried out in the presence of water in an amount of from 20 to 20,000% by weight based on starting material (II).

4. A process as claimed in claim 1 wherein the reaction is carried out in water alone and with the hydrogen halide forming during the reaction as the acid.

5. A process as claimed in claim 1 wherein water with or without ice is placed in the reactor in such an amount that the acid concentration which continuously increases during the reaction does not exceed 10% by weight of hydrogen halide based on the total weight of water.

6. A process as claimed in claim 1 wherein the reaction is carried out with additional acid in an amount of from 0.1 to 1 mole per mole of starting material (II).

7. A process as claimed in claim I wherein the reaction is carried out in the presence of an alkali metal salt of a mineral acid.

8. A process as claimed in claim 1 wherein the reaction is carried out in the presence of an alkaline earth metal salt of a mineral acid.

9. A process as claimed in claim 1 wherein the reaction is carried out in the presence of a mineral acid salt of an alkali or alkaline earth metal in an amount of from 5 to 40% by weight based on the total amount of water.

10. A process as claimed in claim 1 wherein the reaction is carried out in the presence of a chloride or sulfate of one of the metals sodium, potassium, magnesium and calcium.

11. A process as claimed in claim 1 carried out at a temperature of from $-15°$ to $+15°C$.

12. A process as claimed in claim 1 carried out in the presence of an organic solvent which is inert under the reaction conditions.

* * * * *

UNITED STATES PATENT AND TRADEMARK OFFICE
CERTIFICATE OF CORRECTION

PATENT NO. : 3,852,317
DATED : December 3, 1974
INVENTOR(S) : Fritz Zanker

It is certified that error appears in the above—identified patent and that said Letters Patent are hereby corrected as shown below:

In Column 1, in the Heading, insert "[30] Foreign Application Priority Data   November 16, 1971   Germany   P 21 56 761.3"

Signed and Sealed this

Twenty-seventh Day of July 1976

[SEAL]

*Attest:*

RUTH C. MASON
*Attesting Officer*

C. MARSHALL DANN
*Commissioner of Patents and Trademarks*